US005857482A

United States Patent [19]

Dowling

[11] Patent Number: 5,857,482

[45] Date of Patent: Jan. 12, 1999

[54] SYSTEM FOR CONTROL OF FLUID VESSEL OVERFLOWS

[76] Inventor: Donald C. Dowling, 206 Stevens Ave., Cedar Grove, N.J. 07009

[21] Appl. No.: 589,653

[22] Filed: Jan. 6, 1996

[51] Int. Cl.$^6$ .......................... F16K 31/02; F16K 51/00; H01H 35/18

[52] U.S. Cl. ....................... 137/312; 122/504; 122/504.2; 122/507; 126/344; 126/388; 137/392; 137/558; 200/61.04; 200/64.05; 307/118; 340/605; 340/620; 361/178

[58] Field of Search .................................... 126/344, 374, 126/383, 419, 423, 437; 137/312, 386, 387, 392, 554, 558; 68/208; 134/57 D, 58 D; 200/61.04, 61.05, 83 WM, 84 R; 73/313; 307/118; 340/604, 605, 620, 623, 625; 361/178; 122/504, 504.2, 507

[56] References Cited

U.S. PATENT DOCUMENTS

| | | | |
|---|---|---|---|
| 1,688,092 | 10/1928 | Smith | 122/504 |
| 3,063,432 | 11/1962 | Bond et al. | 122/504 |
| 3,069,671 | 12/1962 | Taylor | 122/504 |
| 3,473,553 | 10/1969 | Collins | 137/312 |
| 3,770,002 | 11/1973 | Brown | 137/312 |
| 3,920,031 | 11/1975 | Maxfield | 137/312 |
| 4,805,662 | 2/1989 | Moody | 137/312 |
| 4,944,253 | 7/1990 | Bellofatto | 137/312 |
| 5,029,605 | 7/1991 | Dowling et al. | 137/312 |
| 5,188,143 | 2/1993 | Krebs | 137/312 |

*Primary Examiner*—George L. Walton

*Attorney, Agent, or Firm*—M. K. Silverman

[57] ABSTRACT

An overflow control system includes a vessel having a liquid input and output, the vessel having a top and bottom defined by the gravity vector. The system further includes a housing peripherally surrounding the vessel about all surfaces, other than the bottom, to provide a fluid and thermal insulation region between the vessel and the housing. The system also includes a liquid collection chamber formed integrally beneath the vessel and housing, and in fluid communication with the insulation region. A leak or fracture of the vessel will result in an accumulation of liquid in the collection chamber. The system further includes a normally open electrically actuatable solenoid disposed within the liquid input. Within the liquid output of the vessel is provided a check valve for closing the output responsive to any gradient of fluid pressure in the direction of the vessel in excess of a reference level. The system, in addition, includes a liquid detector, disposed within the liquid collection chamber, the detector including an element within an electrical circuit having electrical communication between the solenoid in the input and the liquid detector, and extending along the length of the housing within the insulating region, in which the liquid detector will close a circuit responsive to a reference level of liquid within the liquid collection chamber, this permitting current flow to the solenoid to actuate it, this blocking further input of liquid to the vessel. The system also includes an element for disabling an energy input to the vessel responsive to actuation of the liquid detector. Also, a momentary switch may be included in electrical communication with the liquid level sensor to provide for self-testing of all system circuitry and normally open mechanical elements.

10 Claims, 3 Drawing Sheets

SYSTEM FOR CONTROL OF FLUID VESSEL OVERFLOWS

REFERENCE TO DOCUMENT DISCLOSURE

This Application corresponds in subject matter to that of Document Disclosure No. 384,232.

BACKGROUND OF THE INVENTION

This invention is an improvement of the invention reflected in our U.S. Pat. No. 5,029,605 (1991), entitled Fluid Vessel Overflow System.

The need for the present inventive system, as set forth herein, has developed as a result of development and testing of the invention of our said U.S. Pat. No. 5,029,605, and in response to needs of the marketplace which have arisen and which are addressed by the present improvement. The incorporation of such new areas into our system of control of fluid vessel overflows results in a system having an enhanced safety and cost-effectiveness in residential application.

More particularly, during the period since the grant of our said U.S. Pat. No. 5,029,605, that is, since July, 1991, patents have been granted to third parties which provide for the external connection of the various and sundry leak detection, energy source cutoff, and user signalling means. In other words, the prior art as it has developed since 1991, has entailed the removal of certain of the elements of our 1991 system, e.g., the solenoid means and liquid detection means, from the envelope defined by our fluid-tight peripheral housing, for the purpose of elaborating the function of the solenoid and liquid detection means, typically through the use of integrated circuitry and computer control means. Representative of such efforts are the patents to Furr, that is, U.S. Pat. Nos. 5,315,291 and 5,334,973, both of which entail the use of external electrical and mechanical means requiring external elements such as wiring, mechanical drive means, metallic foil, and external soldering to install the same. One result of systems such as Furr is that such systems cannot be economically built and sold in the residential market. Accordingly, while complex electrical and mechanical improvements of our 1991 system may exhibit certain value in large special purpose commercial and industrial structures, they are economically and technically infeasible to use or sale in a typical residential context.

Also, the prior art, as is known to the within inventors, does not provide a simple and cost-effective means of terminating the energy source of the system in the event of a tank leak, nor does it provide a means of assuring the internal integrity of the vacuum within the fluid vessel. That is, without a means of assuring maintenance of the internal vacuum (notwithstanding a leak or break in the liquid vessel), air in the plumbing, external to the hot water tank will attempt to occupy the water-containing volume of the hot water tank thereby accelerating the rate of the leak until most of the entire volume of the peripheral containment housing has been filled with water. It is the importance of maintaining the integrity of the vacuum within the liquid vessel (hot water tank) in the event of a leak therein has not been fully recognized by the art, this particularly in systems in which the safety means thereof are mechanically and electrically integrated into the envelope of the fluid vessel or are connected immediately thereabove to the input and/or output lines of the tank as a part of the original installation of the liquid vessel or hot water tank.

Other examples in the art of leak detection and leak management apparatus which make use of complex external electromechanical systems is reflected in U.S. Pat. No. 5,345,224 to Brown; No. 5,357,241 to Welch, and No. 5,428,347 to Barron. It is, accordingly, the need which has developed in the art for an effective integrated fluid vessel overflow system and which is cost-effective for use in the residential area, that has given rise to the instant invention.

SUMMARY OF THE INVENTION

The instant invention relates to an overflow control system for a heated liquid vessel. The system more particularly comprises a vessel having a liquid input and output, the vessel having a top and bottom defined by the gravity vector. The system further includes a housing peripherally surrounding said vessel about all surfaces, other than the bottom thereof, to thereby provide a fluid and thermal insulation region between said vessel and said housing. The system yet further includes a liquid collection chamber formed integrally beneath said vessel and said housing, and in fluid communication with said insulation region. Therein, a leak or fracture of the vessel will result in an accumulation of liquid in the collection chamber. The system further includes a normally open electrically actuatable conduit closure means disposed within said liquid input of said vessel. Within said liquid output of the vessel is provided means for closing said output responsive to any negative fluid pressure in the direction of the vessel in excess of a reference level thereof. The system yet further includes liquid detection means, disposed within the liquid collection chamber, said means including an element within an electrical circuit having electrical communication means disposed between said conduit closure means of said input and said liquid detection means, and extending along the length of said housing within said insulating region, in which said liquid detection means will close a circuit responsive to a reference level of liquid within said liquid collection chamber, this permitting current flow to said conduit closure means to actuate said means, thereby blocking further input of liquid to said vessel. The present system still further includes means for disabling an energy input to said vessel responsive to actuation of said liquid detection means.

It is accordingly an object of the invention to prevent leakage of water from a hot water vessel or the like through termination of the water input thereto and preservation of the internal vacuum within the vessel.

It is another object to provide a system of the above type that will operate with minimal use of power and which will not pose a safety hazard to persons in the vicinity of the system.

It is a further object of the invention to provide a water tank leak prevention system having integrated features of water input termination, energy input termination and means for assuring the vacuum integrity of the fluid vessel in the event of a leak thereof.

It is a still further object of the invention to provide a system of the above type which will provide a warning to a user of a leak or other abnormal condition.

It is a yet further object to provide a system of the above type which is cost-effective to purchase, install and maintain within a residential context.

It is another object to provide a system of the above type which includes means for self-testing of the system circuitry thereof.

The above and yet other objects and advantages of the present invention will become apparent from the hereinafter set forth Brief Description of the Drawings, Detailed Description of the Invention and Claims appended herewith.

DETAILED DESCRIPTION OF THE INVENTION

Figure 1:
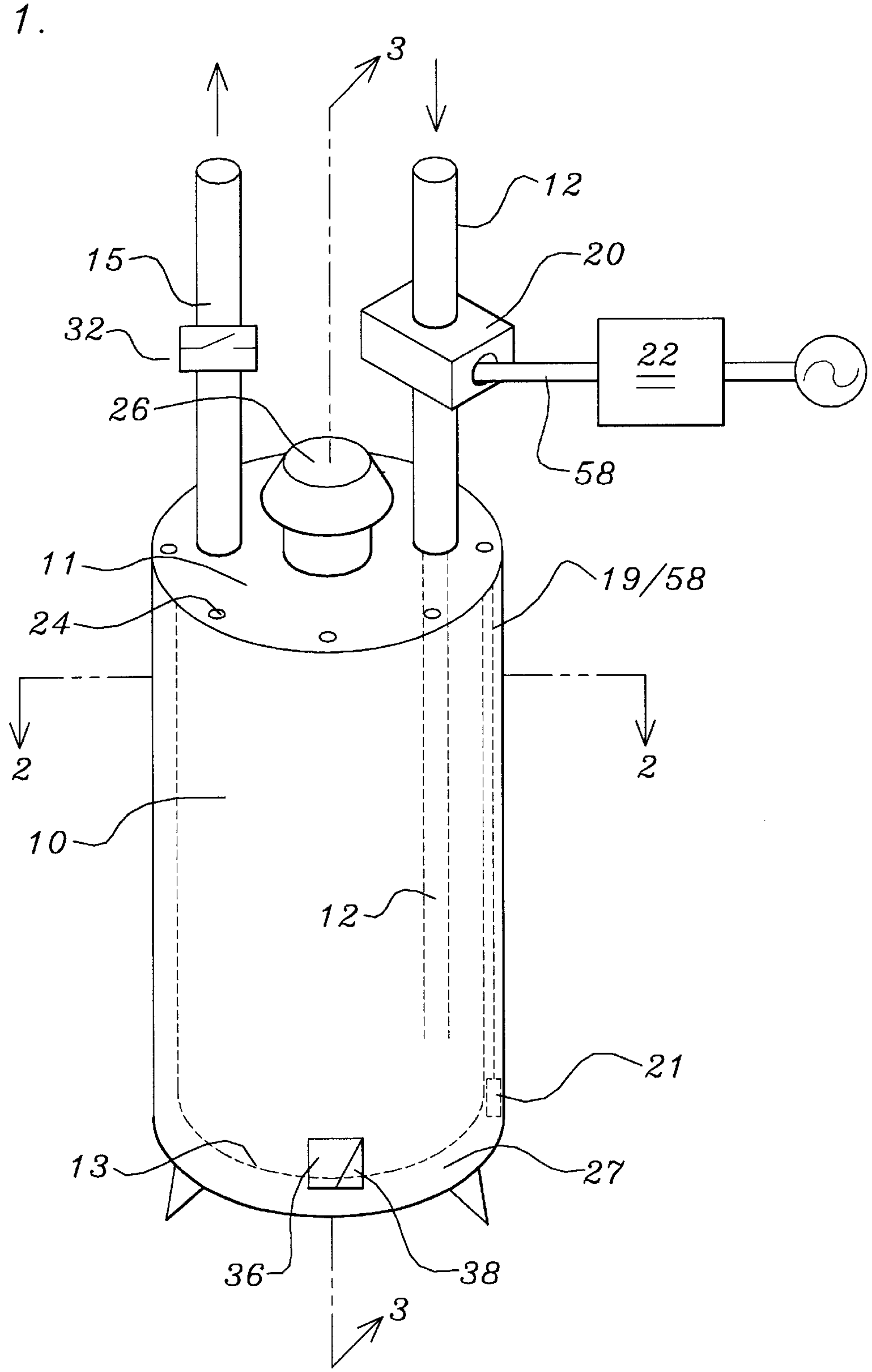
FIG. 1 is a perspective schematic view of a hot water vessel equipped with the instant system.

With reference to the perspective view of FIG. 1, the inventive overflow control system may be seen to include a vessel 10, such as a hot water tank, having a liquid input 12 and a liquid output 15. In a typical water tank arrangement, input 12 will be a cold water line and output 15 will be a hot water line.

Said vessel 10 also includes a top surface 11 and a bottom surface 13.

Figure 2:
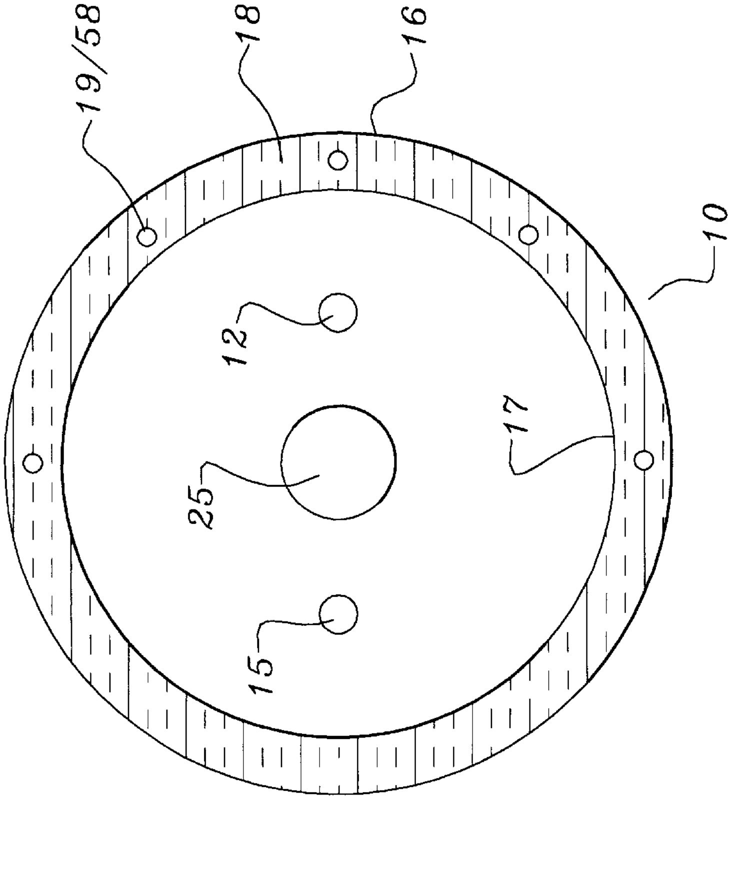
FIG. 2 is a radial cross-sectional view taken along Line 2—2 of FIG. 1.

With reference to the radial cross-sectional view of FIG. 2, the vessel 10 may be seen to include a peripheral housing 16 which peripherally surrounds a vertical interior surface 17 of the vessel 10. Also shown in the views of FIGS. 1 and 2 is said liquid input 12, said liquid output 15 and a fluid gas exhaust pipe 25 which terminates in a flue gas exit 26.

From the geometry of FIG. 2, it may be noted that an annular insulation region 18 is defined between interior surface 17 and the peripheral housing 16. Said region 18 is typically filled with a thermal insulating material. Electrical insulation may also be included therein. Also shown in the view of FIGS. 2 and 3 is electrical communication means 19 which is described below.

The inventive system also includes a liquid collection chamber 27 formed integrally beneath said vessel 10 and said housing 16. Said liquid collection chamber may be seen in the diametric axial cross-sectional view of FIG. 3 in which as, as well, may be seen a gas burner 29 and an internal glass line 31. Thereby, the relationship between burner 29, flue pipe 25 and fluid exit 26 is shown.

It is noted that said liquid collection chamber 27 will collect liquid or moisture resulting from a break or fracture in either the bottom 13 of vessel 10, or the vertical interior surface 17 thereof. It is also noted that top surface 11 is actually located above an interior top surface 14 such that moisture occurring as a result of a break in either input 12 or output 15 at a point above surface 11 will pass through weep holes 24 (See FIG. 1) and, therefrom, into a region 30 between said surfaces 11 and 14, into annular region 18, and therefrom into the liquid collection chamber 25.

Figure 3:
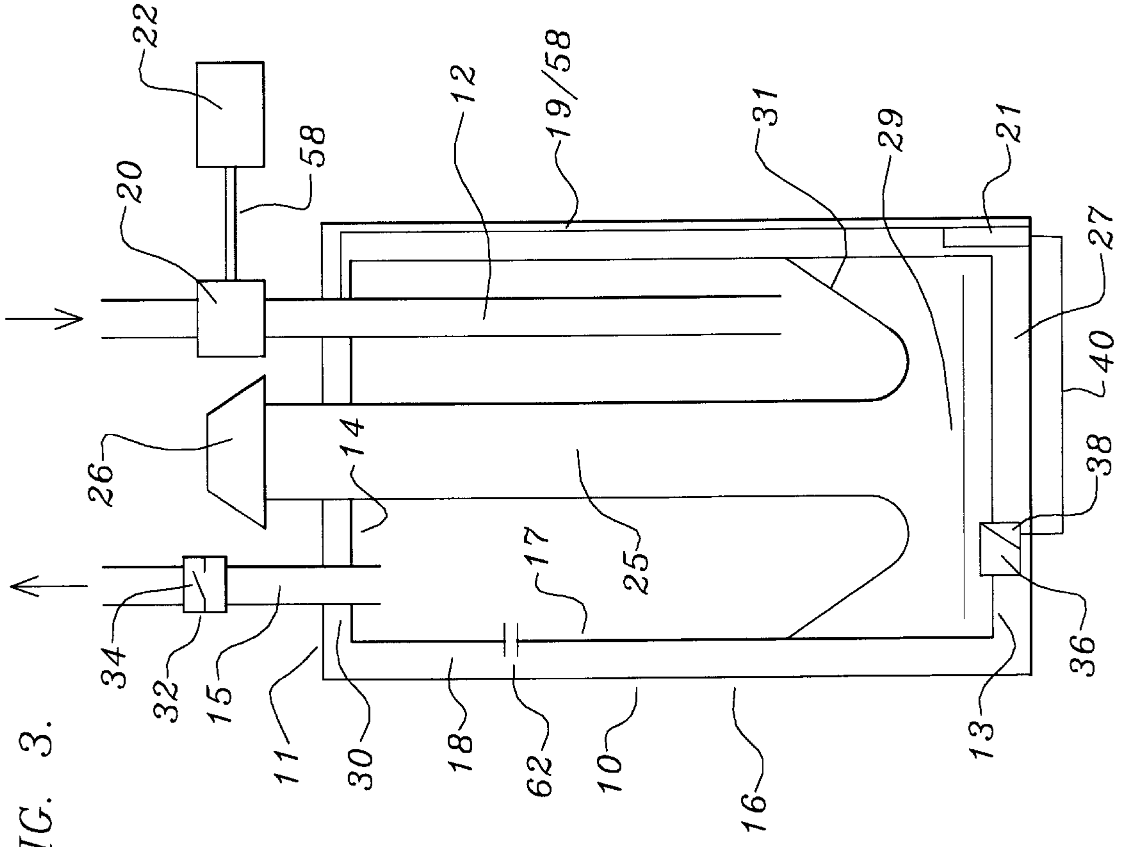
FIG. 3 is an axial diametric view taken along Line 3—3 of FIG. 1.

With further reference to the views of FIGS. 1 and 3, there is shown a fluid solenoid 20 disposed within said input 12 of the vessel. It is noted that said solenoid normally draws no current from a transformer 22 which, typically, is a line voltage transformer in which a typical line input of 120 volts AC and 5 amperes at 60 Hertz is, converted into an output 59 of between 12 and 24 volts DC at 1000 milliamperes. Accordingly, it is to be appreciated that said solenoid 20 is powered by a low voltage low current source and, further, by virtue of the structure of solenoid 22, will operate in a normally mechanically open position in which no current will be drawn unless the solenoid is actuated by electrical communication 19, further described below.

Within said liquid collection chamber 27 is disposed liquid detection means 21 which is an element such as a moisture sensor. The liquid detection means is connected to electrical communication means or line 19 which comprises a part of an electrical circuit, more fully described below, which includes said solenoid 20. As may be noted, the electrical communication 19 is mechanically protected by virtue of its enclosure within insulation region 18. Further, in the structure of the instant invention, the above-defined circuit is a normally open circuit which will only become a closed, i.e., current-carrying circuit, when the circuit is actuated responsive to a reference level of liquid within the chamber 27. Such a level of liquid must be sufficient to reach liquid detection sensor 21 thereby creating a closed circuit. When this occurs, current will flow through detection sensor 21, electrical communication means 19, and into solenoid 20, thereby actuating said solenoid to cause a mechanical blockage, by an armature of the solenoid 20, of input 12. A solenoid suitable for use in the present application has been found to be a solenoid Model 3100 produced by Superior Valve Company, Valencia, Calif. 91335 or any means responsive to a measurable pressure differential between the input and the output thereof.

As a result of the usage of a normally open solenoid which typically does not draw any current and, as well, the use of a low current transformer power source, the above described system is safer than those known in the prior art during both normal operation and during emergency operation. Also, the energy associated with certain prior art systems is saved.

It may be appreciated that the principles of the instant invention apply to many household appliances including, without limitation, hot water tanks.

With further reference to FIGS. 1 and 3 there is shown a check valve 32 which is situated within the output conduit 15 of the liquid vessel 10. Check valve 32 more particularly comprises a means for closing the output conduit 15 responsive to any gradient of fluid pressure from the plumbing system of the building to the vessel 10, that is, negative air pressure or vacuum relative to the plumbing system which is in excess of a reference level. In other words, in order to assure the internal vacuum integrity of the vessel 10 in the event of a leak or fracture thereof, an internal closure element 34 (see FIG. 3) of the check valve 32 will close, thereby assuring that a necessary level of vacuum pressure within the vessel 10 will be maintained. Thereby, the possibility of positive pressure entering the vessel from the external plumbing system is precluded and, with it, the possibility that such unwanted positive pressure will act to accelerate the rate of leakage of water through the leak or fracture from the interior of vessel 10 into the annular insulation region 18 that is defined between the vertical interior 17 and the peripheral housing 16 of the insulation region 18.

There is, with further reference to the views of FIGS. 1 and 3, shown an energy source 36 which, in any given heated liquid vessel may constitute a source of electrical energy (such as an electrical resistance heater), a gas heater such as that operated by gas supplied by the power company, an oil burner, or a propane gas such as that supplied from bottled propane gas.

Shown next to energy source 36 is disablement means 38 in electrical and/or mechanical communication with energy source 38 which, through electrical communication means 50, receives from liquid detection means 21 information responsive to detection of a leak condition. Upon receipt of suitable information, disablement means 38 will electrically and/or mechanically disable the energy source 36.

Figure 4:
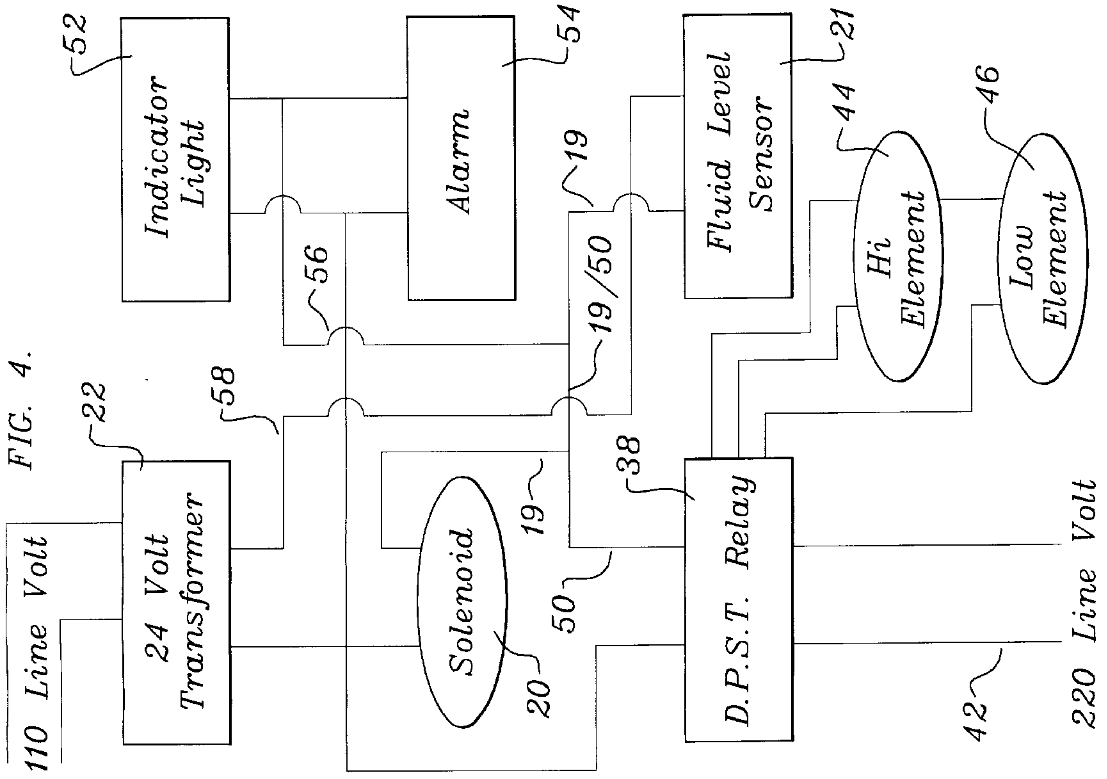
FIG. 4 is an electrical schematic suitable for use with the solenoid means, leak detection means, water source and energy source termination means of the instant invention.

With reference to the wiring diagram of FIG. 4, the electrical connections between solenoid 20, transformer 22, and liquid detection sensor 21 are shown. Further shown in FIG. 4 is the disablement means 38, which may take the form of a double pole single throw relay, which exists for the energy source 36 which is electric energy, when the same is used as the power source.

In the wiring diagram of FIG. 4 there is shown a 220 line voltage input 42 which would comprise a typical electric energy source.

Element 44 and element 46 in FIG. 4 correspond to respective high temperature and low temperature heating elements which are typically associated with an electrically heated water tank.

As may be further noted in FIG. 4, said electrical communication 50 is provided between disablement means 38 and the liquid level sensor 21, such that both solenoid 20 and disablement means 38 of the electric energy source 42 are actuated responsive to the sensing of a reference fluid level within the annular region 18. Also shown therein is said electrical communication means 19 which connects fluid sensor 21 to solenoid 20.

Further shown in FIG. 4 is an indicator light 52, situated upon the vessel 10, which will provide a visual warning that a leak or fracture condition has occurred. Also shown in FIG. 4 is an alarm 54 that may be situated anywhere within the residence of interest to provide an audio alert of a leak or fracture condition. Further shown therein is electrical connection 56 between fluid level sensor 21 and the indicator light 52 and alarm 54. Also shown in FIGS. 1 to 4 is electrical communication 58 between transformer 22 and fluid sensor 21.

Figure 5:
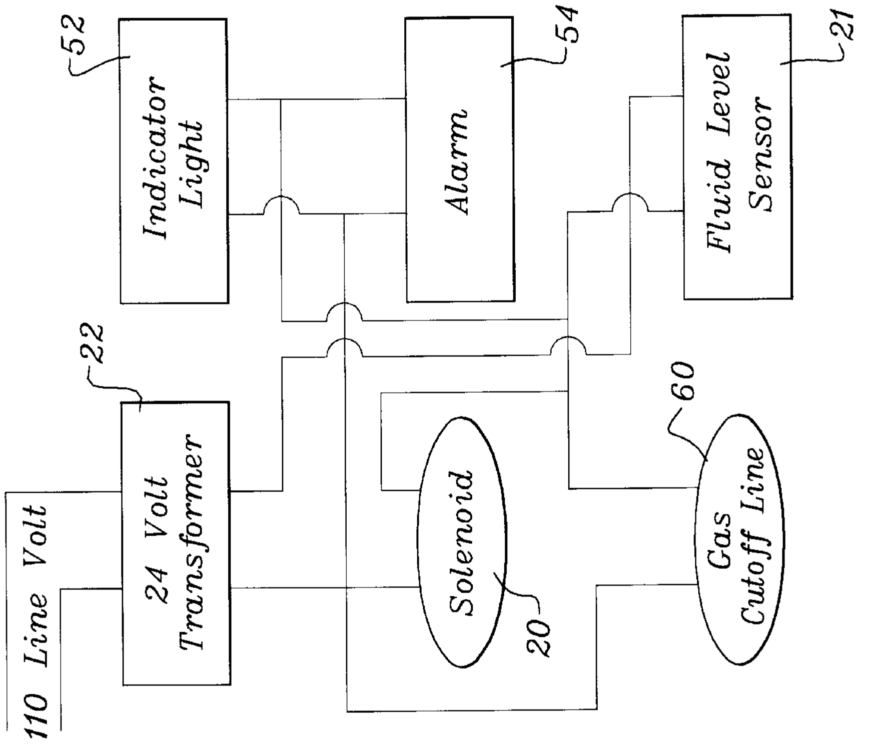
FIG. 5 is a wiring schematic suitable for use with the solenoid means, leak detection means and a source termination means for a gas heated vessel.

With reference to FIG. 5 there is shown wiring diagram for a gas fired hot water vessel. This diagram differs from that of FIG. 4 only in its use of a gas cut off valve 60, of a type sold by Asco, Inc., in Fairfield, N.J. in lieu of the relay shown as the disablement means 38 in FIG. 4.

It is, with further reference to FIGS. 4 and 5, to be noted that, in a preferred embodiment of the invention, a momentary switch would be inserted within electrical line 19. This would permit the system to be periodically tested, in order to simulate the actuation of fluid level sensor 21 and thereby to test the operability of solenoid 20, check valve 32, and relay 38 or gas cut-off valve 60.

It is further noted that all state of the art vessels, such as vessel 10, are provided with a so-called temperature-and-pressure relief valve 62 (see FIG. 3) which, in the event of an excess pressure or temperature condition, creates an aperture in the vessel wall to permit release of the contained fluid. Therefore, the present invention should be understood to include any type of fluid communication between the output of the relief valve 62 and the liquid collection chamber 27.

Accordingly, while there has been shown and described the preferred embodiment of the present invention, it is to be appreciated that the invention may be embodied otherwise than is herein shown and described and that, within said embodiments, certain changes may be made in the form and detail of the parts without departing from the underlying idea or principles of this invention within the scope of the claims appended herewith.

Having thus described our invention what we claim as new, useful and non-obvious and, accordingly, secure by Letters Patent of the United States is:

1. An overflow control system for a liquid vessel, the system comprising:

(a) a vessel having a liquid input and a liquid output, said vessel having a top and bottom respectively defined by the gravity vector;

(b) a housing peripherally surrounding said vessel about all surfaces other than said bottom thereof, said housing defining a region of fluid and thermal insulation about said vessel;

(c) a temperature and pressure release valve disposed both integrally within a portion of a vertical wall of said vessel and within said region of fluid and thermal insulation about said vessel, in which said valve, in an event of actuation thereof, provides a fluid output thereof into said region of fluid and thermal insulation;

(d) a liquid collection chamber formed integrally beneath said vessel and said housing, and in fluid communication with said insulation region, in which a breach of said vessel will result in an accumulation of liquid in said collection chamber;

(e) a normally open, electrically acruatable, conduit closure means disposed within said liquid input of said vessel;

(f) situated within said output of said vessel, means for effecting closure of said output thereof responsive to any gradient, of fluid pressure in the direction of said vessel, which is above a reference level thereof;

(g) liquid detection means disposed in said liquid collection chamber said detection means including an element within an electrical circuit having electrical means disposed between said conduit closure means and said liquid detection means, said element extending along a length of said housing within said region of fluid and thermal insulation, in which said liquid detection means will actuate responsive to a reference level of liquid within said liquid collection chamber, such reference level of liquid occurring in the event of either a breach of said vertical wall of said vessel or an actuation of said temperature and pressure relief valve, such actuation of said liquid detection means permitting current flow to said conduit closure means thereby actuating the same and block further input of liquid to said vessel; and (h) means for disabling an energy input to said vessel responsive to actuation of said liquid detection means.

2. The system as recited in claim 1, in which said conduit closure means includes power input means.

3. The system as recited in claim 2, in which said power input means comprises transformer means employing a line voltage as an input thereto.

4. The system as recited in claim 1, in which said conduit closure means comprises a means having differential pressure closing capacity.

5. The system as recited in claim 1, in which said insulation region further includes electrical insulation means.

6. The system as recited in claim 1, in which said vessel comprises a water tank.

7. The system as recited in claim 1, further including: annunciation means for warning a user of the existence of a fracture condition.

8. The system as recited in claim 1, further comprising:

a momentary switch in electrical communication with said liquid detection means, for simulating system response to an actuation of said liquid detection means.

9. The system as recited in claim 1, in which said conduit closure means comprises solenoid means.

10. The system as recited in claim 8, in which said housing peripherally surrounding said vessel includes a top surface thereof which includes a plurality of apertures in fluid communication with said region of fluid and thermal insulation about said vessel, whereby moisture occurring as a result of a break and above said top surface of said housing will pass downward through said apertures into an upper part of said region of fluid and thermal insulation about said vessel.

* * * * *

UNITED STATES PATENT AND TRADEMARK OFFICE

CERTIFICATE OF CORRECTION

PATENT NO. : 5,857,482

DATED : January 12, 1999

INVENTOR(S) : Dowling

It is certified that error appears in the above-identified patent and that said Letters Patent is hereby corrected as shown below:

On Title page, item [76] Inventors, the following should be added:

Bruce A. Olssen, 54 Morningside Ave.
North Haledon, N.J. 07508.

Signed and Sealed this

Twenty-ninth Day of August, 2000

Attest:

Q. TODD DICKINSON

Attesting Officer

*Director of Patents and Trademarks*